US010207467B2

(12) United States Patent
Hufenbach et al.

(10) Patent No.: US 10,207,467 B2
(45) Date of Patent: Feb. 19, 2019

(54) PULTRUSION METHODS AND ARRANGEMENTS FOR MANUFACTURING A FIBRE-REINFORCED COMPOSITE PRODUCT

(71) Applicants: Airbus Operations GmbH, Hamburg (DE); Leichtbau-Zentrum Sachsen GmbH, Dresden (DE)

(72) Inventors: Werner Hufenbach, Hamburg (DE); Christian Garthaus, Hamburg (DE); Florian Lenz, Hamburg (DE); Thomas Behnisch, Hamburg (DE); Bernhard Witschel, Hamburg (DE)

(73) Assignees: Airbus Operations GmbH (DE); Leichtbau-Zentrum Sachsen GmbH (DE)

( * ) Notice: Subject to any disclaimer, the term of this patent is extended or adjusted under 35 U.S.C. 154(b) by 734 days.

(21) Appl. No.: 14/614,579

(22) Filed: Feb. 5, 2015

(65) Prior Publication Data
US 2015/0217503 A1    Aug. 6, 2015

(30) Foreign Application Priority Data

Feb. 6, 2014 (EP) ..................... 14154109

(51) Int. Cl.
| | | |
|---|---|---|
| B29C 70/52 | (2006.01) | |
| B29K 101/12 | (2006.01) | |
| B29L 31/00 | (2006.01) | |
| B29C 35/08 | (2006.01) | |

(52) U.S. Cl.
CPC .... *B29C 70/528* (2013.01); *B29C 2035/0811* (2013.01); *B29K 2101/12* (2013.01); *B29L 2031/001* (2013.01)

(58) Field of Classification Search
None
See application file for complete search history.

(56) References Cited

U.S. PATENT DOCUMENTS

| | | | |
|---|---|---|---|
| 5,468,327 A | 11/1995 | Pawlowicz et al. | |
| 2006/0087059 A1* | 4/2006 | Boissonnat | ......... B29C 47/0021 264/555 |
| 2006/0131547 A1* | 6/2006 | Aisenbrey | ................ H01B 1/22 252/511 |
| 2011/0121479 A1 | 5/2011 | Lengsfeld et al. | |
| 2013/0134621 A1 | 5/2013 | Tsotsis et al. | |

FOREIGN PATENT DOCUMENTS

| | | |
|---|---|---|
| DE | 10 2011 018 419 A1 | 10/2012 |
| DE | 10 2011 018 420 A1 | 10/2012 |
| WO | 02/06037 A1 | 1/2002 |

OTHER PUBLICATIONS

European Search Report (EP 14154109.4) dated Sep. 12, 2014.

* cited by examiner

*Primary Examiner* — Ryan M Ochylski
(74) *Attorney, Agent, or Firm* — Lerner, David, Littenberg, Krumholz & Mentlik, LLP

(57) ABSTRACT

In a pultrusion method for manufacturing a fiber-reinforced composite product comprising reinforcing fibers embedded in a thermoplastic matrix material, the following is performed along a path of pultrusion: providing a preform; further downstream, inductively heating the preform to a processing temperature of the thermoplastic matrix material; and, further downstream, introducing the preform into a die and consolidating the preform by means of the die while the preform passes through the die.

16 Claims, 6 Drawing Sheets

PULTRUSION METHODS AND ARRANGEMENTS FOR MANUFACTURING A FIBRE-REINFORCED COMPOSITE PRODUCT

FIELD OF THE INVENTION

The present invention relates to the manufacturing of fibre-reinforced composite products by pultrusion. The invention further relates to pultrusion methods for manufacturing fibre-reinforced composite products, to a product manufactured in accordance with such a method, as well as to arrangements for manufacturing fibre-reinforced composite products by pultrusion.

Although the present invention may be useful for improving various kinds of pultrusion processes, the invention and the difficulties encountered when performing other pultrusion processes or using other pultrusion arrangements will be explained in the following in greater detail with regard to the manufacturing of a hollow composite profile comprising reinforcing fibres and a thermoplastic matrix by pultrusion. As an example illustrating the problems encountered with known manufacturing processes, the production of a pipe-shaped fibre-reinforced composite product will be discussed in the following.

BACKGROUND OF THE INVENTION

Methods for manufacturing a hollow profile, in particular a tube-type hollow profile, made of fibre-reinforced thermoplastic are described in DE 10 2011 018 419 A1 and in DE 10 2011 018 420 A1. In accordance with these methods, a braid of a plurality of hybrid rovings or fibre tapes, which comprise reinforcing fibres as well as a thermoplastic matrix material, is provided by braiding. In order to achieve impregnation of the fibres and consolidation, the braid is then pulled into a die. The die has several zones which are provided with means for adjusting the temperature. According to the pultrusion methods of DE 10 2011 018 419 A1 and DE 10 2011 018 420 A1, in an impregnation zone of the die, a first one of these means provides for heating up to the melting temperature of the thermoplastic matrix material.

However, methods such as those described in DE 10 2011 018 419 A1 or DE 10 2011 018 420 A1 may lead to considerable friction when the braid is pulled through the die. Therefore, such methods require complex and costly measures, described in these documents, to be taken in order to ensure that the friction is lowered to an acceptable level, so as to avoid, for example, accumulation of fibres upstream of the die during pultrusion, deformation of the braid and damage to the fibres.

Furthermore, the length of fibre-reinforced composite product that can be produced per unit of time, and the speed at which the braid can be pulled through the die for this purpose, is limited by the capability of the manufacturing arrangement employed to effectively heat the braid to the process temperature that is required, in particular the melting temperature of the matrix material. If heating the braid is performed by means of surface contact with a heated die, sufficiently rapid, thorough and uniform heating of the braid is rather difficult to achieve.

Moreover, with regard to industrial applications, it may be desirable to further increase the product quality, for example regarding porosity, fibre damage and alignment, of the composite product that is produced, compared to known methods and arrangements, and/or to decrease the efforts that have to be made in order to satisfy industry standards regarding product quality.

BRIEF SUMMARY OF THE INVENTION

It would thus be desirable to be able to produce composite products of high quality, comprising reinforcing fibres embedded in a thermoplastic matrix material, in a more efficient, yet reliable way, while keeping the manufacturing process and manufacturing arrangement as simple and robust as possible.

In view of this, one idea of the present invention is to provide pultrusion methods and arrangements which make it possible to manufacture a fibre-reinforced composite product in an improved, more efficient manner and to avoid at least some of the aforementioned difficulties.

Accordingly, there is provided a first pultrusion method for manufacturing a fibre-reinforced composite product comprising reinforcing fibres embedded in a thermoplastic matrix material, wherein along a path of pultrusion, the following steps are performed:
  a preform is provided;
  further downstream, the preform is inductively heated to a processing temperature of the thermoplastic matrix material, wherein the processing temperature is suitable for enabling subsequent consolidation of the preform; and
  further downstream, the preform is introduced into a die and, while the preform passes through the die, the preform is consolidated by means of the die in order to form the composite product.

There is also provided a second pultrusion method for manufacturing a fibre-reinforced composite product comprising reinforcing fibres embedded in a thermoplastic matrix material, wherein along a path of pultrusion, the following steps are performed:
  a preform is provided;
  further downstream, the preform is introduced into a first die and, while the preform passes through the first die, the preform is pre-compacted by means of the first die;
  further downstream, the pre-compacted preform is heated to a processing temperature of the thermoplastic matrix material, wherein the processing temperature is suitable for subsequent consolidation of the preform; and
  further downstream, the preform is introduced into a second die and, while the preform passes through the second die, the preform is consolidated by means of the second die in order to form the composite product.

A fibre-reinforced composite product proposed by the invention is manufactured by performing such a first or second pultrusion method and comprises reinforcing fibres embedded in a thermoplastic matrix material.

The invention further proposes arrangements for manufacturing a fibre-reinforced composite product comprising reinforcing fibres embedded in a thermoplastic matrix material by pultrusion.

A first arrangement comprises an induction device which is suitable for inductively heating a preform as the preform is moved through or past the induction device. Further, the first arrangement comprises a die arranged downstream of the induction device in the direction of movement of the preform along a path of pultrusion. The die is arranged and adapted in such a manner that the preform can be introduced into the die and can pass through the die for thereby being consolidated by means of the die in order to form the composite product.

A second arrangement comprises a first die which is arranged and adapted in such a manner that a preform can be introduced into the first die and can pass through the first die for thereby being pre-compacted by means of the first die. The second arrangement also comprises a heating device that is arranged downstream of the first die in the direction of movement of the preform along a path of pultrusion. The heating device is suitable for heating the pre-compacted preform as the pre-compacted preform is moved through or past the heating device. Moreover, the second arrangement comprises a second die arranged downstream of the heating device in the direction of movement of the preform along the path of pultrusion. The second die is arranged and adapted in such a manner that the preform can be introduced into the second die and can pass through the second die for thereby being consolidated by means of the second die in order to form the composite product.

In particular, each of the first and second arrangements may be used for manufacturing a fibre-reinforced composite product by performing the first or second method proposed by the invention.

An idea underlying the present invention is that a pultruded fibre-reinforced composite product of high quality can be manufactured in an efficient and reliable manner when heating the preform to the processing temperature of the thermoplastic matrix material is carried out upstream of the die that is used for subsequent consolidation. The required heat for consolidation can therefore be added already upstream of the die by means of which consolidation is performed. Thus, it is possible to use a consolidating die that is not actively heated, which advantageously helps to reduce adhesion of thermoplastic matrix material to the die.

Inductive heating using a varying magnetic field makes it possible to heat the preform in a very rapid and energy-efficient manner. There is no need to introduce the heat into the preform through an outer surface thereof, as for example by absorption of infrared radiation or by convective heat transport from a hot fluid surrounding the preform or by contact of the outer surface of the preform with the hot surface of a heated die. Instead, using inductive heating, heat is generated throughout the thickness of the preform. By means of induction, the preform can therefore be heated to the processing temperature required by the thermoplastic matrix material in a rapid and uniform manner, even in case that the preform has a significant thickness. Therefore, inductive heating may be particularly suitable for heating preforms comprising two or more layers. Difficulties related to voids and hollows inside the preform that may slow down heat conduction from a heated outer surface of the preform to the interior thereof are avoided, and product quality as well as reproducibility are thus significantly enhanced. A device for performing inductive heating further requires only a small installation space. Also, the amount of heat generated in the preform can be controlled well, and a local overheating and degradation of the thermoplastic matrix material of the preform can be prevented. As the inductive heating does not require surface contact, the friction during pultrusion is lowered and a good surface quality of the product is preserved.

Pre-compacting the preform by means of at least one first die, heating the preform downstream of the first die, and further downstream, consolidating the preform by means of at least one second die is advantageous in that changes in the cross-sectional dimensions of the preform may be accomplished in at least two steps. As the heating to the processing temperature takes place downstream of the pre-compacting operation, consolidation of the preform has not yet been started in the pre-compaction step, whereby the pre-compaction is facilitated. During consolidation by means of the second die, only a reduced variation in the cross-sectional dimensions of the preform is induced. In this manner, accumulation and jamming of fibres during the process, in particular upstream of the die that achieves consolidation, can be avoided. This may also contribute to a good quality of the product regarding porosity, fibre alignment and undulation as well as evenness of the outer surface of the product.

In the context of the present application, the term "path of pultrusion" should be understood as referring to a path along which the material proceeds through a pultrusion arrangement or pultrusion line during a pultrusion process. The terms "upstream" and "downstream" should therefore be understood as being defined in relation to this movement of material along the path. As an example, one end of a pultrusion arrangement at which the finished pultruded product exits from the arrangement will be regarded as a "downstream" end of the arrangement. As a further example, material moved (e.g. pulled) along the path of pultrusion during the process gradually may be introduced into a die at an "upstream" end thereof and, after passing through the die, exits at a "downstream" end of the die.

Furthermore, in the context of the present application, the words "first" and "second" appearing in the terms "first die" and "second die" are used to designate dies without excluding the possibility that further, additional dies, if desirable, might be added in some embodiments of the inventive methods or arrangements, either upstream of the first die, downstream of the second die or between the first and second dies. In other words, the terminology "first die" and "second die" is not intended to limit the total number of dies that may be present. However, as described above, in the case of the present invention, heating the preform to the processing temperature of the thermoplastic matrix material takes place upstream of the die used for subsequent consolidation. It is to be understood that the heat for heating the preform up to the processing temperature is not introduced by means of a contact surface of a heated die through an outer surface of the preform, but instead is introduced in a non-contact manner.

Moreover, it should be understood that the pultruded product, which is obtained when performing the above-described first or second method or using the first or second arrangement of the invention, may be a final composite product but may also be an intermediate composite product. Further, the provided preform may not be pre-compacted at the stage of providing it, but alternatively may be pre-compacted at least in part and/or to some extent at the stage of providing it, and may undergo further pre-compaction by means of the first die.

Specifically, it should be understood that in the methods and arrangements of the present invention, the pre-compaction of the preform can be accomplished completely by a single first die or, alternatively, can be accomplished by an arrangement of several first dies such that each of the first dies contributes to the pre-compaction. Additionally or alternatively, the consolidation step can be accomplished completely by means of a single die or a single second die but, alternatively, may be accomplished by an arrangement of several dies or several second dies, such that each of these dies or second dies contributes to the consolidation process.

Thus, consolidating a preform by means of a die or a second die in order to form the composite product, as this formulation is used in the present application, means that the die or second die at least contributes to the consolidation process from which finally the composite product results, but that the consolidation is not necessarily carried out by the die or second die alone. Similarly, pre-compacting the preform by means of a first die, as used in the present application, means that the first die at least contributes to the pre-compaction process, and that other first dies may be present or not.

Moreover, it is envisaged that, if this is desirable, each of the first and second inventive methods may be performed several times in a row in order to obtain a final product of increased thickness. Accordingly, if desired, each of the first and second arrangements could be provided several times in series for manufacturing a single pultruded product.

It can thus be appreciated that the inventive methods and arrangements make it possible to efficiently manufacture fibre-reinforced composite products having a high quality and comprising a thermoplastic matrix in which the fibres are embedded. Such a product, due to its thermoplastic matrix, can advantageously be subjected to a forming operation at a later stage in order to provide a component of desired shape. Efficient manufacturing of such a light-weight composite product of high quality may be useful in many fields of technology such as, for example, in aircraft or spacecraft construction or in automobile technology.

Advantageous improvements and developments of the invention are contained in the dependent claims as well as in the description, which refers to the figures of the drawings.

According to an embodiment of the first method, the die is actively cooled. According to an improvement of the first arrangement, the die is provided with means for actively cooling the die. By active cooling, the die can be kept at a desired temperature while the product is pultruded, so that adherence of the thermoplastic matrix material to a contact surface of the die can be avoided in a further improved manner. Reduced adherence of the matrix material to the die allows to avoid defects in the surface of the product and to obtain a composite product of good quality.

According to a further embodiment of the first method and the first arrangement, at least in the region of a contact surface of the die which contacts the preform passing through the die, the die is actively cooled to a temperature below the processing temperature of the thermoplastic matrix material. In particular, the die may be actively cooled in the region of the contact surface to a temperature equal to or lower than the solidification temperature of the thermoplastic matrix material. In this way, when the preform is introduced into the die, a layer of material facing and contacting the contact surface of the die can solidify, whereby the material can slide more easily through the die without leaving residues on the contact surface. Traces and faults on the product surface are thereby avoided in an even better way and the quality of the surface of the product is preserved.

According to an embodiment of the first method and the first arrangement, an effective length of the die, measured along the path of pultrusion, is chosen based on the speed of delivery of the product multiplied by a predefined residence time of a section of the preform inside a defined portion of the die. According to a preferred variant of this improvement, the effective length of the die may substantially correspond to $L=(v \cdot T)+Le$, wherein L designates the effective length of the die, v designates the delivery velocity of the product along the path of pultrusion, e.g. given in cm per minute, T designates the predefined residence time, and in particular may equal T=0.01 minutes, and Le designates the length of an inlet portion of the die, Le being equal to zero if there is no inlet portion. This may help to reduce the friction between the preform and the die.

In a further, exemplary embodiment of the first method and first arrangement, the effective length of the die, measured along the path of pultrusion, substantially corresponds to 50 percent of an outer cross-sectional dimension of the product. However, the relation $L=(v \cdot T)+Le$ may give other effective lengths of the die in other examples.

According to an embodiment of the first method and the first arrangement, the induction device comprises a conductor, for example formed as an induction coil, which is actively cooled. In this way, the conductor can be protected against overheating.

According to a further embodiment of the first method and the first arrangement, the composite product is actively cooled, for example by an airflow directed onto the product, downstream of the die. Thereby, the cooling of the pultruded composite product downstream of the die can be accelerated and the final shape of the product can be quickly frozen.

According to an embodiment of the first method and the first arrangement, the die is embodied as a second die. Further, according to this development, upstream of inductively heating the preform, a step of introducing the preform into a further die, which is embodied as a first die, and of pre-compacting the preform by means of the first die while the preform passes through the first die is performed. This advantageously helps to further improve the surface quality of the product obtained, as the pre-compacted and heated preform can more easily be introduced and guided into the second die for consolidating it. The method may thereby be rendered more reliable, the risk of jamming of the reinforcing fibres may be reduced and the friction between the dies and the preform can be lowered, whereby a product of good quality is obtained in an efficient process.

In a further embodiment of the first method and the first arrangement, before and/or while passing through the first die, the preform is pre-heated to a temperature below, in particular significantly below, the processing temperature of the thermoplastic matrix material. The thermoplastic material may in this way be rendered, to some extent, more flexible than without pre-heating, which simplifies the pre-compaction of the preform. Accumulation and jamming of reinforcing fibres upstream of the first die can thereby be avoided.

According to another embodiment of the first method and the first arrangement, the pre-heating is carried out by radiation, in particular by infrared radiation, or by convective heat transfer from a heated fluid, in particular from hot air. In accordance with an alternative development, the pre-heating may be carried out inductively. A moderate pre-heating in order to influence the flexibility of the preform can be carried out expediently as a radiative or convective pre-heating step, as the amount of heat that should be introduced into the preform per unit of time is limited. Inductive pre-heating, if performed, is preferably carried out at significantly reduced power, compared to the inductive heating performed in order to reach the processing temperature further downstream. Inductive pre-heating requires only small installation space, is particularly energy-efficient, and can be controlled well.

According to an embodiment of the first method and the first arrangement, the first die is arranged inside a pre-heating chamber for pre-heating the preform, the pre-heating chamber being arranged and adapted to let the preform pass into the pre-heating chamber, through the first die, and out of the pre-heating chamber towards the heating device.

According to an embodiment of the first method and the first arrangement, an effective length of the first die, measured along the path of pultrusion, is chosen based on the speed of delivery of the product multiplied by a predefined residence time of a section of the preform inside a defined portion of the first die. According to a preferred variant of this improvement, the effective length of the first die may substantially correspond to L1=(v·T1)+L1e, wherein L1 designates the effective length of the first die, v designates the delivery velocity of the product along the path of pultrusion, e.g. given in cm per minute, T1 designates the predefined residence time, and in particular may equal T1=0.01 minutes, and L1e designates the length of an inlet portion of the first die, L1e being equal to zero if there is no inlet portion. This can help to reduce the friction between the preform and the first die.

In a further embodiment of the first method and first arrangement, the effective length of the first die, measured along the path of pultrusion, substantially corresponds to 50 percent of an outer cross-sectional dimension of the pre-compacted preform.

According to an embodiment of the second method, the second die is actively cooled. According to an improvement of the second arrangement, the second die is provided with means for actively cooling the second die. By active cooling, the second die can be kept at a desired temperature while the product is pultruded, so that adherence of the thermoplastic matrix material to a contact surface of the second die can be avoided in a further improved manner. Reduced adherence and sticking of the matrix material to the second die allows to avoid defects in the surface of the product and to obtain a composite product of good quality.

According to a further embodiment of the second method and the second arrangement, at least in the region of a contact surface of the second die, which contacts the preform passing through the second die, the second die is actively cooled to a temperature below the processing temperature of the thermoplastic matrix material. In particular, the second die may be actively cooled in the region of the contact surface to a temperature equal to or lower than the solidification temperature of the thermoplastic matrix material. In this way, when the preform is introduced into the second die, a layer of material facing and contacting the contact surface can solidify, whereby the material can slide more easily through the second die, so that faults on the product surface are avoided even better and a product of good surface quality is obtained.

According to another embodiment of the second method, the heating of the preform to the processing temperature of the thermoplastic matrix material is performed by means of induction. According to a preferred development of the second arrangement, the heating device comprises an induction device capable of heating the pre-compacted preform as the pre-compacted preform is moved through or past the induction device. Inductively heating the preform to the processing temperature can take place in a rapid and energy-efficient manner and does not require mechanical sliding contact with an outer surface of the preform. Thereby, friction during pultrusion is avoided and the pultrusion process is rendered more efficient.

According to an embodiment of the second method and the second arrangement, the induction device comprises a conductor, for example formed as an induction coil, which is actively cooled. Overheating of the conductor can thereby be avoided.

According to an alternative embodiment of the second method and the second arrangement, the heating of the preform to the processing temperature of the thermoplastic matrix material is performed by means of radiation, in particular infrared radiation, or by means of convective heat transfer from a heated fluid, in particular hot air, to the preform. While inductive heating is preferred, convective or radiative heating may be an expedient option in particular if the preform is thin.

According to a further embodiment of the second method and second arrangement, the composite product is actively cooled, for example by an airflow directed onto the product, downstream of the second die. Thereby, the cooling of the pultruded composite product downstream of the second die can be accelerated. In this manner, the final shape of the product can be quickly frozen.

According to a further embodiment of the second method and the second arrangement, the preform is pre-heated to a temperature below, in particular significantly below, the processing temperature of the thermoplastic matrix material, before and/or while the preform passes through the first die. The thermoplastic material may in this way be rendered, to some extent, more flexible than without pre-heating, which simplifies the pre-compaction of the preform. Accumulation and jamming of reinforcing fibres upstream of the first die can thereby be avoided.

According to another embodiment of the second method and the second arrangement, the pre-heating is carried out by radiation, in particular by infrared radiation, or by convective heat transfer from a heated fluid, in particular from hot air. In accordance with an alternative development, the pre-heating may be carried inductively. A moderate pre-heating in order to influence the flexibility of the preform can be carried out expediently as a radiative or convective pre-heating step, as the amount of heat that should be introduced into the preform per unit of time is limited. Inductive pre-heating, if performed, is preferably carried out at significantly reduced power, compared to an inductive heating which may be used further downstream for reaching the processing temperature. Inductive pre-heating is space-spacing, energy-efficient and can be controlled well.

According to an embodiment of the second method and the second arrangement, the first die is arranged inside a pre-heating chamber for pre-heating the preform, the pre-heating chamber being arranged and adapted to let the preform pass into the pre-heating chamber, through the first die, and out of the pre-heating chamber towards the heating device.

According to an embodiment of the second method and the second arrangement, an effective length of the first die, measured along the path of pultrusion, is chosen based on the speed of delivery of the product multiplied by a pre-defined residence time of a section of the preform inside a defined portion of the first die. According to a preferred variant of this improvement, the effective length of the first die may substantially correspond to L1=(v·T1)+L1e, wherein L1 designates the effective length of the first die, v designates the delivery velocity of the product along the path of pultrusion, e.g. given in cm per minute, T1 designates the predefined residence time, and in particular may equal T1=0.01 minutes, and L1e designates the length of an inlet portion of the first die, L1e being equal to zero if there is no inlet portion. This can help to reduce the friction between the preform and the first die.

In a further embodiment of the second method and second arrangement, the effective length of the first die, measured along the path of pultrusion, substantially corresponds to 50 percent of an outer cross-sectional dimension of the product.

According to a further advantageous embodiment of the second method and the second arrangement, an effective length of the second die, measured along the path of pultrusion, is chosen based on the speed of delivery of the product multiplied by a predefined residence time of a section of the preform inside a defined portion of the second die. According to a preferred variant of this improvement, the effective length of the second die may substantially correspond to $L2=(v \cdot T2)+L2e$, wherein L2 designates the effective length of the second die, v designates the delivery velocity of the product along the path of pultrusion, e.g. given in cm per minute, T2 designates the predefined residence time, and in particular may equal $T2=0.01$ minutes, and L2e designates the length of an inlet portion of the second die, L2e being equal to zero if there is no inlet portion. This may help to reduce the friction between the preform and the second die.

In a further embodiment of the second method and second arrangement, the effective length of the second die, measured along the path of pultrusion, substantially corresponds to 50 percent of an outer cross-sectional dimension of the product.

The following embodiments may be applied to each of the first and second methods and first and second arrangements proposed by the invention.

According to an embodiment of the invention, the preform comprises the reinforcing fibres and the thermoplastic matrix material, wherein the thermoplastic matrix material is in a non-molten state upstream of heating the preform to the processing temperature of the thermoplastic matrix material. This contributes to an efficient manufacturing process.

According to an embodiment of the invention, the preform is provided by forming it from a semi-finished product, wherein the semi-finished product comprises the reinforcing fibres and the matrix material. This contributes to an efficient manufacturing process, too.

According to a further embodiment of the invention, the preform is provided by forming it from the semi-finished product entirely or at least in part by braiding. A braid advantageously can be used to establish loops of conductive fibres in the preform that can be employed for effective inductive heating. Also, a braid exhibits an interweave of its basic fibres and hence is more stable against unwanted distortion due to friction.

According to an embodiment of the invention, the first or second arrangement may further comprise at least one braiding device for providing the preform, in particular for providing the preform entirely or at least in part by braiding strands of a semi-finished product which comprises the reinforcing fibres and the matrix material.

According to a further embodiment of the invention, the preform is provided by forming it from the semi-finished product entirely or at least in part by winding. This may help to improve the mechanical properties, in particular strength and/or stiffness, of the product that is obtained.

According to an embodiment of the invention, the first or second arrangement may further comprise at least one winding device for providing the preform, in particular for providing the preform entirely or at least in part by winding strands of a semi-finished product which comprises the reinforcing fibres and the matrix material. In accordance with a further development, the first or second arrangement may comprise a braiding device suitably configured for performing a winding operation.

In accordance with further embodiments of the invention, the first or second arrangements may comprise at least one braiding device and at least one winding device.

In a further embodiment of the invention, providing the preform from the semi-finished product includes braiding and winding strands of the semi-finished product. This can contribute to a product having a desired stiffness while also preserving useful properties of a braid, e.g. with regard to effective inductive heating.

According to a further embodiment of the invention, the preform is formed with several layers. All of the layers may be provided by braiding. Alternatively, all of the layers may be provided by winding. As an example, the layers may be of sleeve-type.

In accordance with a further embodiment, one or some of the layers may be provided by braiding, while the other layers may be provided by means of a different process. For example, the other layers or some of them may be provided by winding.

In another embodiment, at least an outermost layer of the preform is provided by braiding. Layers underneath the outermost braided layer may be provided by braiding or by means of a different process, such as by winding. In a further variant, a combination of braided and wound layers may be formed underneath the outermost braided layer. An outermost braided layer helps to obtain a robust preform, to enhance the surface quality of the pultruded product and to reduce the risk of fibre jamming at the pre-compacting die(s), and may contribute to enhancing fibre alignment and thus the mechanical properties of the pultruded product. One or more layers formed by winding strands of semi-finished product can contribute to increase the stiffness of the pultruded product that is obtained.

According to an embodiment of the fibre-reinforced composite product of the invention, the composite product comprises a laminate, wherein an outermost layer of the laminate comprises an arrangement of interweaved reinforcing fibres that can be provided by means of a braiding process.

The term "strand of a semi-finished product", as it is used in the context of the present application, is intended to be understood in such a manner that the "strand" can comprise, in particular, a plurality of individual reinforcing fibres, and can comprise the matrix material in various forms. A "strand" should not be understood as being limited to a single individual reinforcing fibre.

According to an embodiment of the invention, the preform is provided by forming it as a fabric from a semi-finished product, wherein the semi-finished product comprises the reinforcing fibres and the matrix material. Loops of conductive fibres may also be advantageously established by forming such a fabric.

According to an embodiment of the invention, the semi-finished product is a tape comprising the thermoplastic matrix material and the reinforcing fibres.

According to an embodiment of the invention, the semi-finished product is a fully consolidated tape comprising the reinforcing fibres which are embedded in the thermoplastic matrix material. Using such a semi-finished product makes it possible to obtain a pultruded composite product of high quality, as the step of impregnating the fibres with the thermoplastic matrix, which may often be rather viscous, has already been accomplished before the preform is formed.

According to an embodiment of the invention, the reinforcing fibres include electrically conductive reinforcing fibres, in particular carbon fibres. Such reinforcing fibres can be advantageously used to provide an inductively heatable preform.

According to an embodiment of the invention, the preform comprises a multiaxial arrangement of reinforcing fibres, for example a triaxial arrangement of fibres. This helps to create conductor loops inside the preform for more effectively heating the preform by induction.

According to an embodiment of the invention, the preform is suitably shaped for manufacturing a hollow composite product from the preform. For example, according to a variant, the preform may be sleeve-shaped.

According to a further embodiment of the invention, the preform is provided on a core which is moved downstream along the path of pultrusion together with the preform. The preform may be provided directly on the core or on a liner arranged on the core between the core and the preform.

In an embodiment of the invention, the first or second arrangement further comprises a core which is adapted for being moved along the path of pultrusion together with the preform. In this manner, friction between the preform and the core is avoided.

In an embodiment of the invention, the core may be electrically non-conductive. Such a core may, for example, be made of a composite material comprising glass-fibres embedded in a synthetic material. Alternatively, such a core may be made of a ceramic material. In this way, the core is not heated when moving through or past the induction device, and therefore, the core does not deliver additional heat to the preform arranged on the core.

According to an embodiment of the invention, the core may be actively cooled. Such a core, in particular when it is not heatable by the induction device, can be useful for producing a product having a layered structure, for example a product having a fibre-reinforced layer and a liner without fibres. Such a core may be advantageous for controlling the temperature profile and may be used for manufacturing a fibre-reinforced sliding bearing comprising a thermoplastic sliding layer or for manufacturing fibre-reinforced conduits or pipes comprising a thermoplastic liner.

According to an alternative embodiment of the invention, the core may instead comprise an electrically conductive material and be adapted for being inductively heated. Such a core may be used to create an additional heat flux from the core into the preform for further increasing the efficiency of the heating.

In an embodiment of the invention, the fibre-reinforced composite product is formed as a hollow fibre-reinforced composite profile. In particular, the product may be tube-shaped. A cross-section of such a tube-shaped composite product may be circular, but other cross-sectional shapes are possible as well.

According to an embodiment of the invention, the processing temperature is equal to or higher than the melting temperature of the thermoplastic matrix material. Such a processing temperature is particularly suitable for effective consolidation of the preform and fusion of the matrix of individual layers and/or strands of semi-finished product.

According to an embodiment of the invention, the preform may proceed along the path of pultrusion at a constant rate of feed, which contributes to a simpler pultrusion process. However, in other, alternative developments, the preform could proceed along the path of pultrusion at a time variable rate of feed, if desired.

In a further embodiment of the invention, the preform may be provided and fed as a preform having a defined length. According to an alternative development, the preform may be provided directly by means of a preforming apparatus, comprising for example a braiding and/or winding device, as a virtually "endless" preform.

According to a further embodiment of the invention, the steps of providing a preform and pre-compacting the preform by means of a first die may be performed two or more times in series along the path of pultrusion in such a manner that an additional preformed layer is formed on top of a previously pre-compacted preformed layer and is then pre-compacted. Preferably, the steps of heating to the processing temperature and of consolidating the preform by means of the second die can then be accomplished after all preformed layers have been provided and pre-compacted. An arrangement in accordance with such a development of the invention is therefore provided with two or more first dies, arranged along the path of pultrusion. Such a development of the invention may be particularly appropriate for manufacturing products having a large thickness or thick-walled hollow products.

According to another embodiment of the invention, the steps of providing a preform, pre-compacting the preform by means of a first die, heating the pre-compacted preform to the processing temperature and consolidating the preform by means of a second die may be performed two or more times in series along the path of pultrusion in such a manner that an additional preformed layer is formed on top of a previously consolidated composite layer, the additional preformed layer being then pre-compacted, heated to the processing temperature, and consolidated. Such a development of the invention may be useful for manufacturing products having a large thickness or thick-walled hollow products, too. An arrangement in accordance with such a development of the invention is provided with two or more first dies and with two or more second dies, arranged along the path of pultrusion.

According to another embodiment of the invention, e.g. in case a step of pre-compacting the preform by means of a first die is not performed, the steps of providing a preform, heating the preform to the processing temperature and consolidating the preform by means of a die may be performed two or more times in series along the path of pultrusion in such a manner that an additional preformed layer is formed on top of a previously consolidated composite layer, the additional preformed layer being then heated to the processing temperature and consolidated. An arrangement in accordance with such a development of the invention is provided with two or more dies for consolidation.

The proposed methods and arrangements of the invention may be used in combination with a wide variety of thermoplastic matrix materials. In particular, if the heating to the processing temperature of the thermoplastic matrix material is carried out inductively, the amount of heat introduced per unit of time into the preform can be well adjusted to the particular matrix material that is present. In preferred variants of the proposed methods and arrangements, the thermoplastic matrix material may comprise, for example, a high-performance thermoplastic such as a polyether ether ketone (PEEK) or a polyphenylene sulfide (PPS). However, other thermoplastic matrix materials may be used, such as, for example, a polyamide (PA).

According to further developments of the invention, the fibre-reinforced composite product manufactured by means of the inventive arrangements and/or by performing the inventive methods may, for example, be used for manufacturing components for general industrial use therefrom, but may also be used, for example, in the field of aircraft or spacecraft technology or in the field of automotive technology. As an example, a component for use in a mobility or transport system, such as an aircraft or spacecraft or an automobile or other kind of vehicle, may be manufactured from the product. According to further examples, components manufactured from the product could be driveshafts, spaceframe structures, tension/compression rods or pipes.

The embodiments, improvements and enhancements described above may be arbitrarily combined with each other whenever this makes sense. Moreover, other possible developments, enhancements and implementations of the invention comprise combinations of features of the invention which have been described above or will be described in the following in relation to the detailed description of embodiments, even where such a combination has not been expressly mentioned.

BRIEF DESCRIPTION OF THE DRAWINGS

The present invention will be explained in the following with reference to the schematic figures of the drawings, which illustrate embodiments of the invention.

Figure 1:
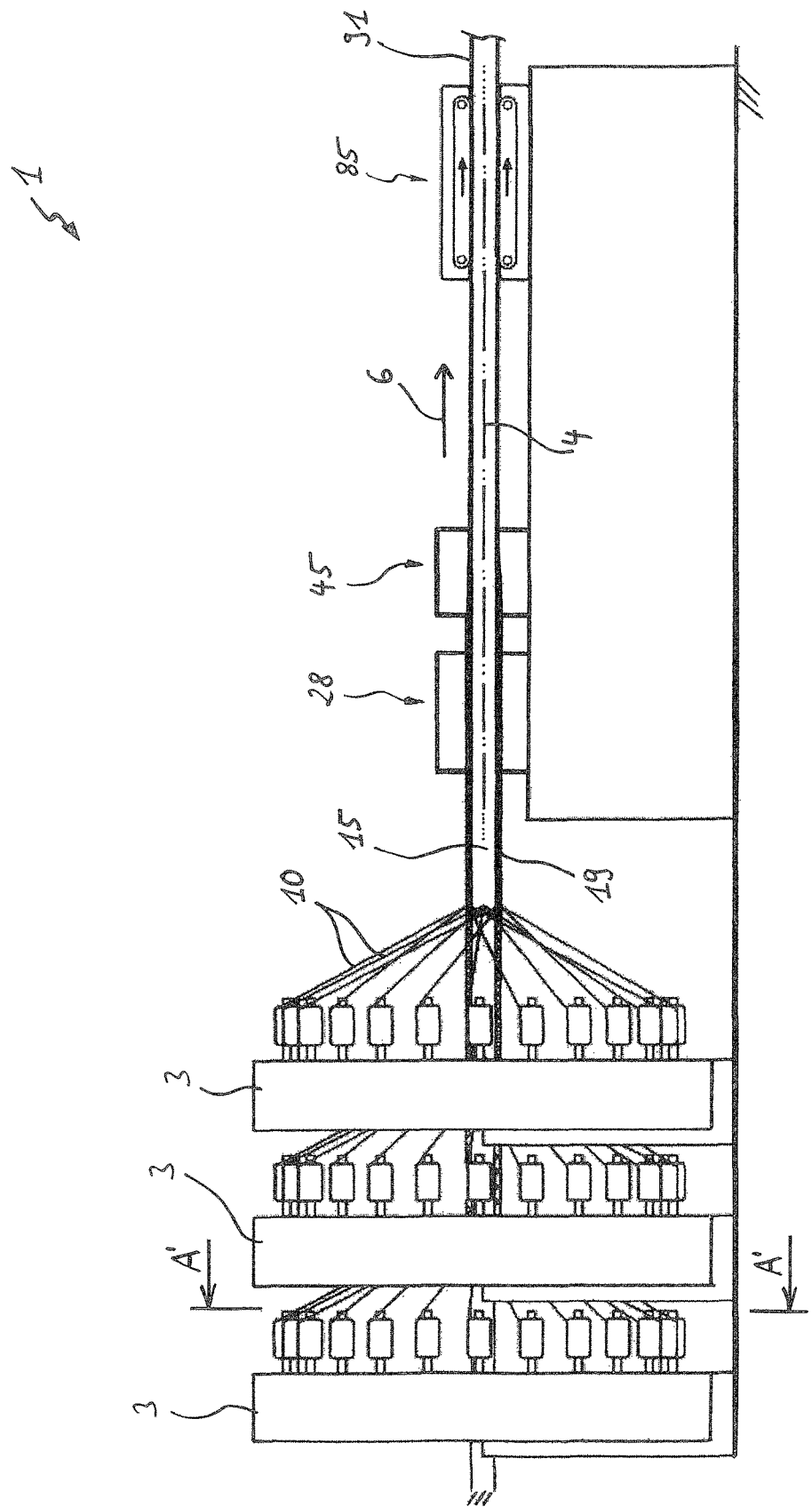
FIG. 1 displays a side view of an arrangement for manufacturing a fibre-reinforced composite product by pultrusion, in accordance with a first embodiment of the invention, in a schematic and simplified manner.

The enclosed drawings are intended to illustrate embodiments of the invention so that the invention may be further understood. The drawings, in conjunction with the description, are intended to explain principles and concepts of the invention. Other embodiments and many of the advantages described may be inferred from the drawings. Elements of the drawings are not necessarily drawn to scale.

Elements, features and products which are identical or which have the same function or effect have been labeled in the drawings using the same reference signs, except where explicitly stated otherwise.

DETAILED DESCRIPTION

Figure 2:
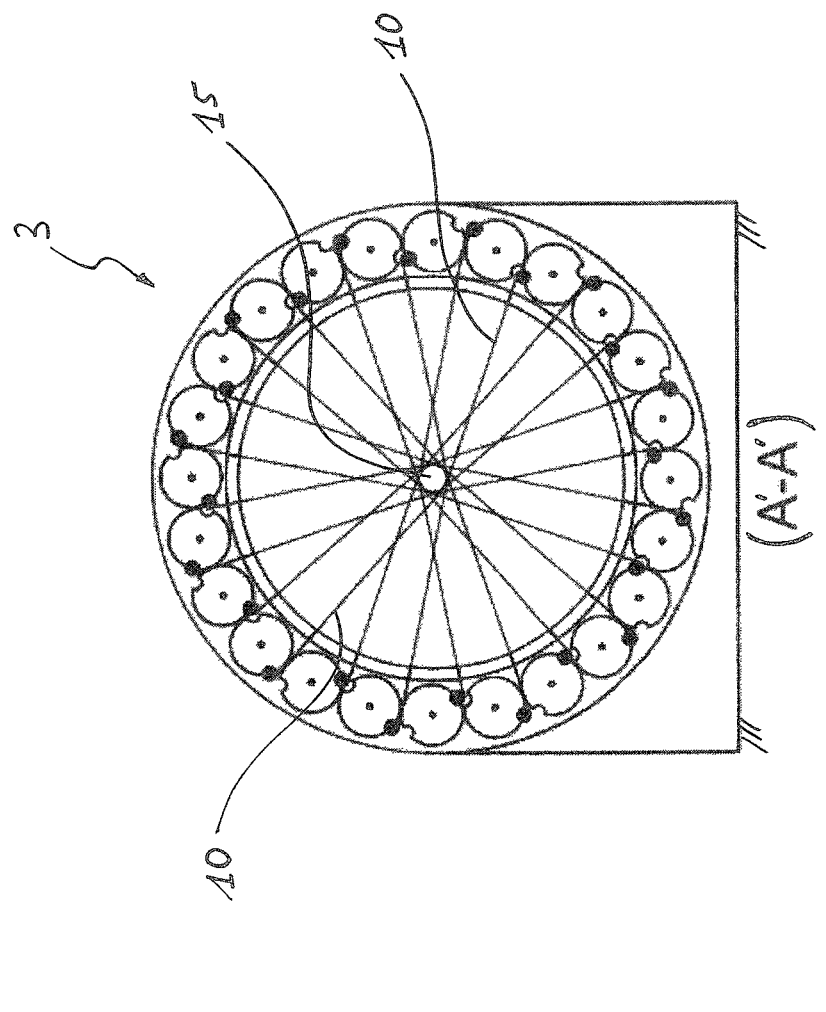
FIG. 2 displays a transverse sectional view along line A'-A' of the arrangement schematically shown in FIG. 1.
Figure 3:
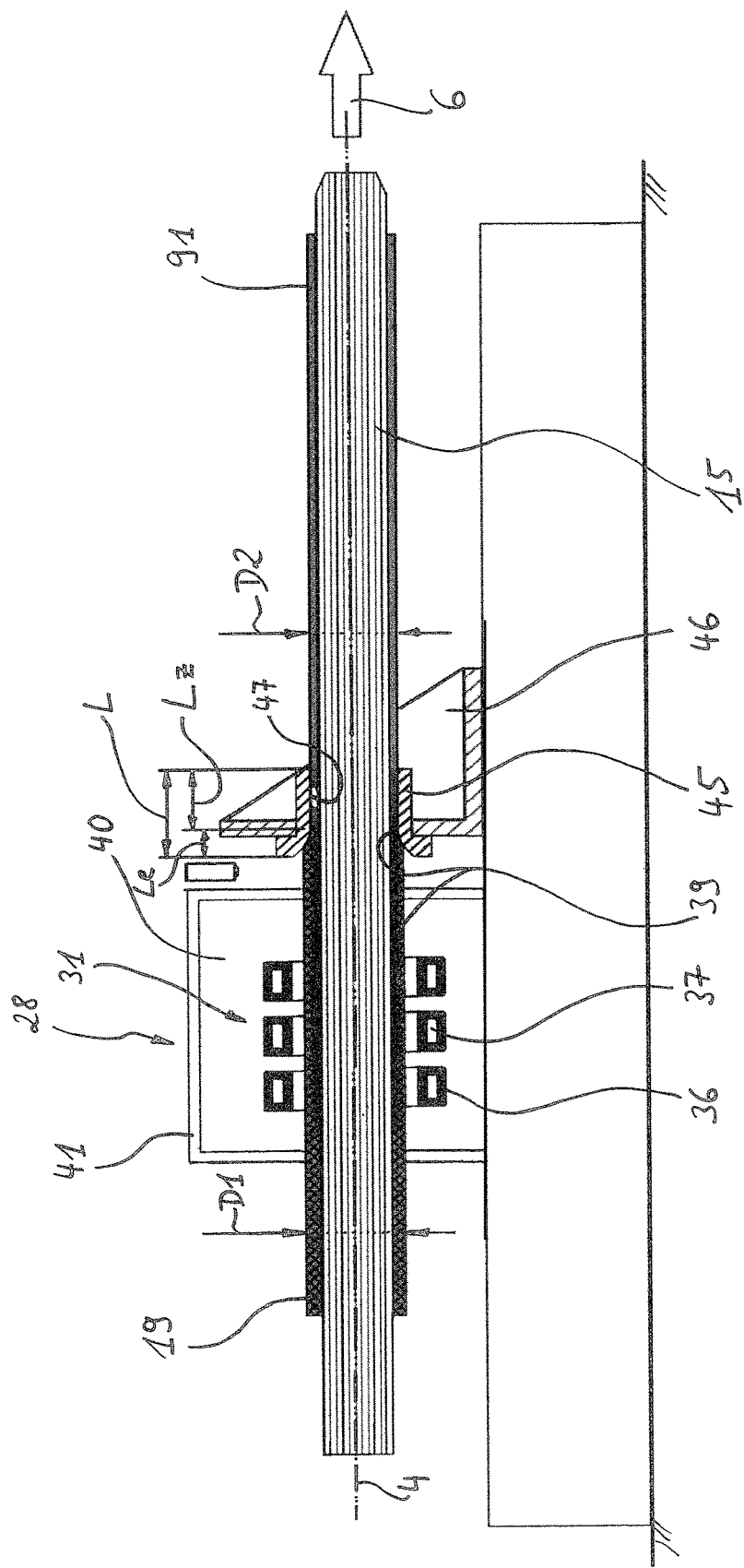
FIG. 3 displays a longitudinal sectional detail view of part of the arrangement according to the first embodiment.

FIGS. 1 to 3 illustrate an arrangement 1 and a method for manufacturing a fibre-reinforced hollow composite product 91 by pultrusion in accordance with a first embodiment of the invention. In the example of FIG. 1, the arrangement 1 is embodied as a pultrusion line. The arrangement 1 comprises several devices 3 which are arranged and adapted for forming a preform 19 on a core 15. As shown, the devices 3 may be adapted to process a number of strands of a semi-finished product in the form of a tape 10 in such a manner as to form a preform 19 comprising several braided layers. One of the devices 3 is schematically shown in FIG. 2 in a cross-section A'-A' of the arrangement 1.

Figure 9:
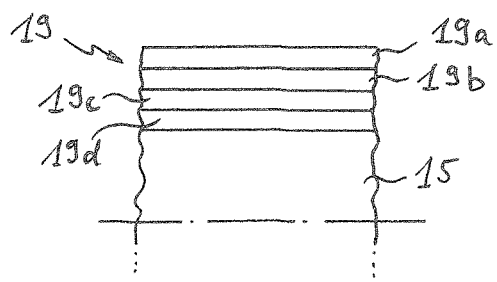
FIG. 9 schematically illustrates an exemplary preform comprising several layers.

In FIGS. 1 and 2, the devices 3 that are shown are implemented in the form of braiding devices 3. However, it should be noted that one or more of the devices 3 can instead be implemented as a winding device or winding devices for winding strands of the tape 10 onto the core 15 or onto a braided or wound layer previously formed thereon. Alternatively, one or more braiding devices 3 may be configured and operated so as to perform a winding operation instead of a braiding operation. Thus, the preform 19 may comprise at least one wound layer and at least one braided layer. An example of a preform 19 comprising several layers 19a, 19b, 19c, 19d is schematically illustrated in FIG. 9. Preferably, the outermost layer 19a of the preform 19 is braided.

The tape 10 processed by the braiding or winding devices 3 of the first embodiment comprises carbon fibres that are embedded in a thermoplastic matrix material, and is fully consolidated already prior to the braiding or winding step. In this sense, the tape 10 can be understood as being pre-consolidated in relation to the braiding and/or winding process. In such a consolidated tape 10, the carbon fibres therefore are well impregnated with the thermoplastic matrix material, and the tape 10 has an advantageously low porosity. At the step of being braided or wound to form the preform 19 on the core 15, the thermoplastic matrix material of tape 10 is in its non-molten or solid state. That is, after preforming, the strands of tape 10 form a sleeve of braided and/or wound layers, but are not yet firmly connected to each other.

If it is desirable for mechanical reasons, unidirectional reinforcing fibres, i.e. axially extending fibres, may additionally be integrated into the braided and/or wound preform via integration of suitably oriented tape 10. Generally, the preform 19 may comprise a multi-axial arrangement of reinforcing fibres.

As illustrated in FIG. 1, the core 15 and the preform 19 are pulled together in a direction of movement 6 so as to simultaneously move along a path of pultrusion 4. For this purpose, any suitable conveying device 85, only schematically sketched in FIG. 1, may be provided, which may comprise conveyor belts or other suitable means for pulling both the pultruded product 91 and the core 15 in direction 6. Any appropriate pulling device suitable for acting on the core 15 and on the product 91 may be used instead of the conveying device 85.

Downstream of the braiding or winding devices 3, the preform 19 is pulled through a heating device 28 and a die 45, which will be described in more detail with reference to FIG. 3.

For the sake of a clear description of the first embodiment, the preform has been provided with two reference signs, namely 19 and 39. Reference sign 19 refers to the preform before it has been inductively heated, and reference sign 39 refers to the heated state of the preform. It will, however, be appreciated that both numerals 19 and 39 refer to different states of the same preform as it is pulled along the path of pultrusion 4 in the downstream direction 6.

In FIG. 3, the core 15 has a substantially circular cross-section. The provided preform 19 is embodied as a sleeve arranged on the core 15. After having been formed onto the core 15, an outer contour of the preform 19 is approximately circular as well and has an outer diameter D1, representing an outer dimension of the preform 19.

During pultrusion, the preform 19 moves along with the core 15 along the path of pultrusion 4 in direction 6, whereby the preform 19 enters a heating chamber 40 of the heating device 28 through an appropriate upstream opening in a heating chamber wall 41. Inside the heating chamber 40, an induction device 31 comprising an induction coil formed of a coiled conductor 36 is arranged. The conductor 36 is provided with an internal cooling channel 37 through which a flow of water is established for actively cooling the conductor 36. Furthermore, the conductor 36 is connected to a suitable power source comprising a frequency generator (not shown in the figure) for causing an alternating current of suitable frequency to flow through the conductor 36. The shape of the induction coil is approximately circular and thereby approximately follows the contour of the composite product 91 to be produced.

As illustrated in FIG. 3, the preform 19 and the core 15 are gradually pulled through the interior of the coil-shaped induction device 31. As the preform 19 passes through the center of the induction coil, a portion of the preform 19 onto which the varying magnetic field produced by the induction coil acts is rapidly and uniformly heated to a processing temperature of the thermoplastic matrix material. The power provided by the induction device 31 is chosen such that the preform 19 reaches the processing temperature of the thermoplastic matrix material, wherein the processing temperature allows subsequent consolidation of the preform in the heated state 39. By varying the frequency and/or power of the alternating current in the induction coil, the magnetic field can be adapted to the properties of the preform 19, e.g. the thickness thereof, the geometry and the materials used. In variants of the first embodiment, the induction coil may be shaped differently, or several induction coils, past which the preform is moved, may be employed, depending on the cross-sectional shape of the product 91 to be manufactured.

The processing temperature up to which the preform 19 is heated by means of the induction device 31 is preferably equal to or higher than the melting temperature of the thermoplastic matrix material. Downstream of the induction device 31, the heated preform 39 leaves the heating chamber 40 through an appropriate downstream opening in the heating chamber wall 41 and is then pulled, along with the core 15, through a die 45. The die 45 thus is arranged downstream of the heating chamber 40 and induction device 31 and is supported by a support 46. In this way, the preform in its heated state 39 is gradually introduced into the die 45 from the upstream side thereof. By means of the die 45, the outer diameter of the preform 39 is reduced to a value D2, the preform 39 is radially compressed and is consolidated. This means that while the hot preform 39 passes through the die 45, voids between the braided and/or wound tapes 10 are removed and the individual strands of tape 10 as well as individual braided and/or wound layers within the preform 39 are joined by fusion so as to form the composite product 91. The consolidation of the preform may thus be understood as a process of applying sufficient pressure to the preform to form a composite, while the thermoplastic matrix material has an appropriate temperature that is at least equal to, and preferably higher than, the melting temperature of the thermoplastic matrix material.

In this manner, the outer shape of the pultruded composite product 91 is defined by means of the polished contact surface 47 of the die 45 which contacts the preform. The final outer shape of the product 91 is frozen downstream of the die 45 by cooling, e.g. by a cooling airflow, not shown in FIG. 3, directed onto the product 91, whereby the thermoplastic matrix material solidifies again. Thus, a product 91 in the form of an endless fibre-reinforced composite tube with a circular cross-section is obtained, in which the reinforcing carbon fibres are embedded in the thermoplastic matrix. In case the outermost layer of several layers of the preform 19, e.g. the outermost layer 19a as displayed in FIG. 9, has been provided by a braiding process, the product 91 obtained comprises a laminate wherein within an outermost layer of the laminate, an arrangement of reinforcing fibres that are interwoven due to the braiding is embedded in the thermoplastic matrix material.

As may be appreciated, the die 45 receives heat from the hot preform 39 when it passes through the die 45 and is consolidated. However, the die 45 of the first embodiment of FIG. 3 is neither provided with a heating means nor with an active cooling means. Thus, the temperature of the die 45 will adjust according to the heat losses it experiences, in particular by conduction towards its support 46 and/or by convective heat exchange with the surrounding atmosphere and/or by radiative heat exchange with its environment.

The die 45 of the arrangement 1 is not used for heating the preform 19 to the processing temperature required for consolidation. Instead, the heating step is carried out inductively upstream of the die 45. In this manner, a surface contact of the preform with an actively heated contact surface is avoided. In consequence, the probability that molten thermoplastic matrix material sticks to the contact surface 47 of the die 45 as well as the friction between the preform 39 and the die 45 are reduced. A reduction or, preferably, a complete prevention of such undesirable sticking and adherence effects facilitates the pultrusion process considerably and avoids surface defects in the pultruded composite product 91.

Although the die 45 of the first embodiment in FIG. 3 is not actively cooled, the die 45 may in a variant of the first embodiment be provided with a suitable cooling means in order to provide active cooling of the die 45, in the same manner as will be described further below for the second die 66 of the second embodiment. Such active cooling of the die 45 makes it possible to keep the temperature of the die 45 at a desired value. In particular, the contact surface 47 of the die 45 can be kept at a desired temperature below the processing temperature of the thermoplastic matrix material, for example at a temperature below the solidification temperature of the thermoplastic matrix material. Thereby, rapid solidification of an outer layer of the hot preform 39 is accomplished and the preform 39 slides through the die 45 without leaving residues on the contact surface 47. A further improved surface quality of the product 91 can thereby be obtained.

The first embodiment of the present invention advantageously uses a die 45 that has a limited axial effective length L measured along the path of pultrusion 4, whereby the friction during pultrusion, in particular between the preform 39 and the die 45, can be significantly lowered. The effective length L may be understood to correspond to the length of an axial portion of the die 45 comprising the surface 47 for acting on the preform 39, e.g. including a converging inlet portion of length Le suitable for introducing and radially compressing the preform 39 (FIG. 3) as well as a portion of length Lz having a cylindrical or, in a variant, slightly conical bore. In this way, a good surface quality of the product 91 is obtained and the risk of accumulation of fibres upstream of the die 45 as well as of damage to the fibre arrangement can be reduced.

The effective length L of the die 45 may advantageously be calculated using the relation $L=Lz+Le=(v \cdot T)+Le$, where v is the delivery velocity of the product along the path 4, e.g. given in centimeters per minute, and T is the desired residence time of a section of the preform 39 inside the cylindrical or, in the variant, slightly conical portion of the die 45, e.g. given in minutes. According to a preferred example, T approximately corresponds to 0.01 minutes. In accordance with a further useful example, the portion of length Lz has a substantially cylindrical bore and the obtained effective length L of the die 45 may correspond to approximately 50 percent of the inner diameter of the cylindrical portion thereof, and thus to approximately 50 percent of the final outer diameter D2 of the pultruded composite product 91 that is obtained. As an example only, Lz=1.2 cm might be used in the case of an inner diameter of the cylindrical bore portion of the die 45 of 3.0 cm, in combination with a length of the converging inlet portion of approximately Le=0.4 cm.

Figure 4:
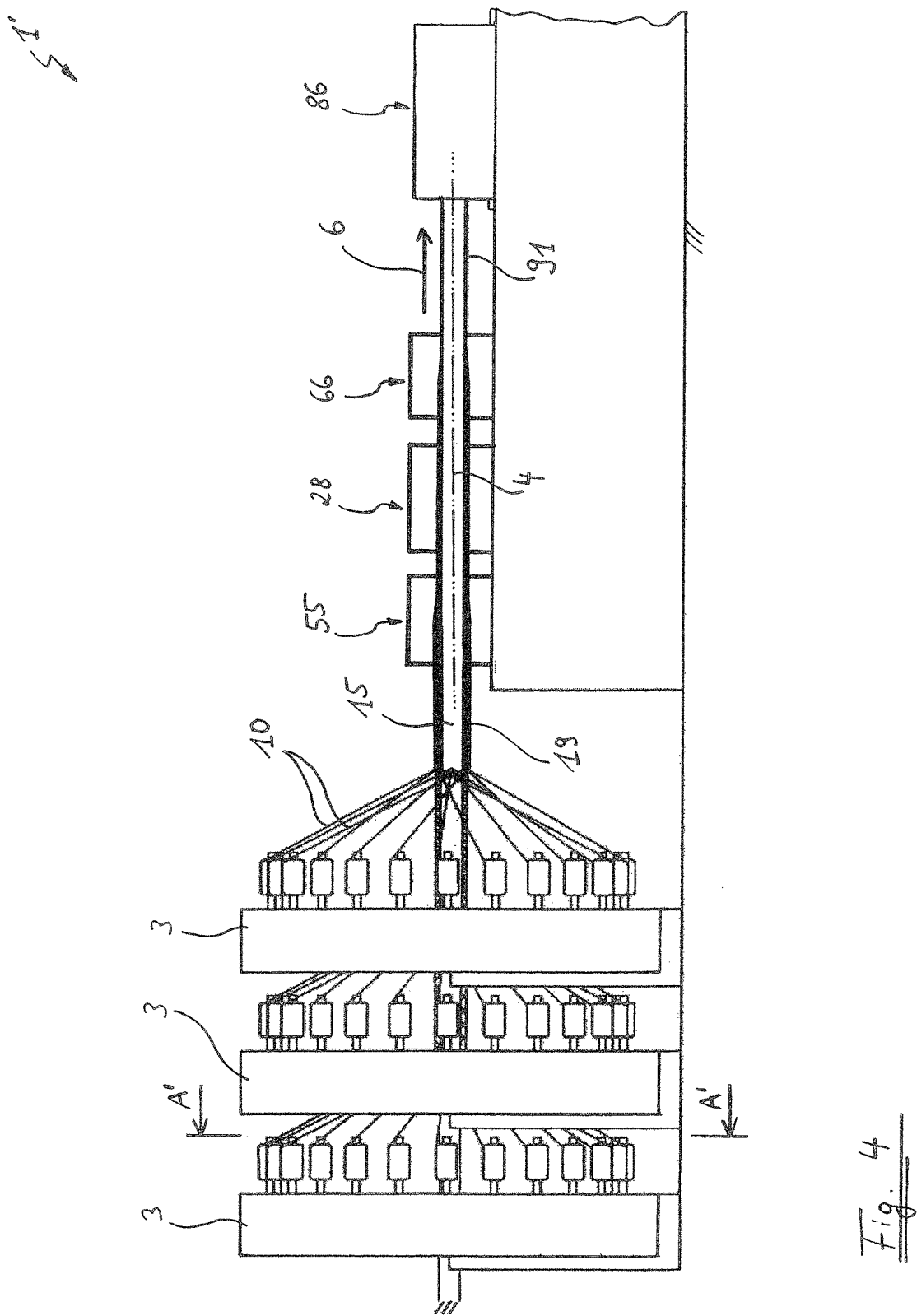
FIG. 4 displays a side view of an arrangement for manufacturing a fibre-reinforced composite product by pultrusion, in accordance with a second embodiment of the invention, in a schematic and simplified manner.

An arrangement 1' and a pultrusion method for manufacturing a fibre-reinforced hollow composite product 91 by pultrusion according to a second embodiment of the present invention will now be described with reference to FIGS. 4 and 5. As shown in FIG. 4, the arrangement 1' comprises devices 3 used for braiding and/or winding strands of tape 10 onto a movable core 15 in order to form a preform 19. The braiding or winding devices 3 are adapted to process a number of strands of a semi-finished product in the form of a tape 10 for forming a preform 19 comprising several braided layers and/or several wound layers. A preform 19 comprising several layers 19a, 19b, 19c, 19d is schematically illustrated in examplary manner in FIG. 9. One of the devices 3 is schematically illustrated for the second embodiment in a cross-section A'-A' by FIG. 2 as well, implemented in exemplary manner as a braiding device.

In FIG. 4, the devices 3 that are shown are implemented in the form of braiding devices 3. It should, however, be noted that one or more of the devices 3 can instead be implemented as a winding device or winding devices for winding strands of the tape 10 onto the core 15 or onto a braided or wound layer previously formed thereon. Alternatively, one or more braiding devices 3 may be configured and operated so as to perform a winding operation instead of a braiding operation. The preform 19 may comprise at least one wound layer and at least one braided layer. Preferably, the outermost layer 19a of the preform 19 is braided.

The tape 10 processed by the braiding or winding devices 3 of FIG. 4 comprises carbon fibres embedded in a thermoplastic matrix material. In the case of the second embodiment as well, the tape 10 is fully consolidated prior to the braiding or winding step. The carbon fibres within the consolidated tape 10 are well impregnated with the thermoplastic matrix material, and the tape 10 has a low porosity. At the step of braiding or winding the tape 10 to form the preform 19 on the core 15, the thermoplastic matrix material is in its non-molten or solid state. This means that after forming the preform, the strands of tape 10 form a sleeve of braided and/or wound layers, but are not yet firmly connected to each other.

Unidirectional reinforcing fibres, i.e. axially extending fibres, may additionally be integrated into the preform via integration of suitably oriented strands of tape 10. Generally, the preform 19 may comprise a multi-axial arrangement of reinforcing fibres.

The core 15 and the preform 19 are pulled in a direction of movement 6 along a path of pultrusion 4 by an appropriate pulling device 86. For pulling the preform 19 in the direction 6, the pulling device 86 acts both on the core 15 and on the finished composite component 91.

As illustrated in FIG. 4, when pultrusion is performed using the arrangement 1' of the second embodiment, the core 15 and the preform 19 move together through a first die 55, a heating device 28 as well as a second die 66, all arranged along the path of pultrusion 4, wherein the heating device 28 is arranged downstream of the first die 55 and the second die 66 is arranged downstream of the heating device 28. The first die 55, the second die 66 and the heating device 28 are illustrated only schematically in FIG. 4, but are shown in more detail in FIG. 5.

Figure 5:
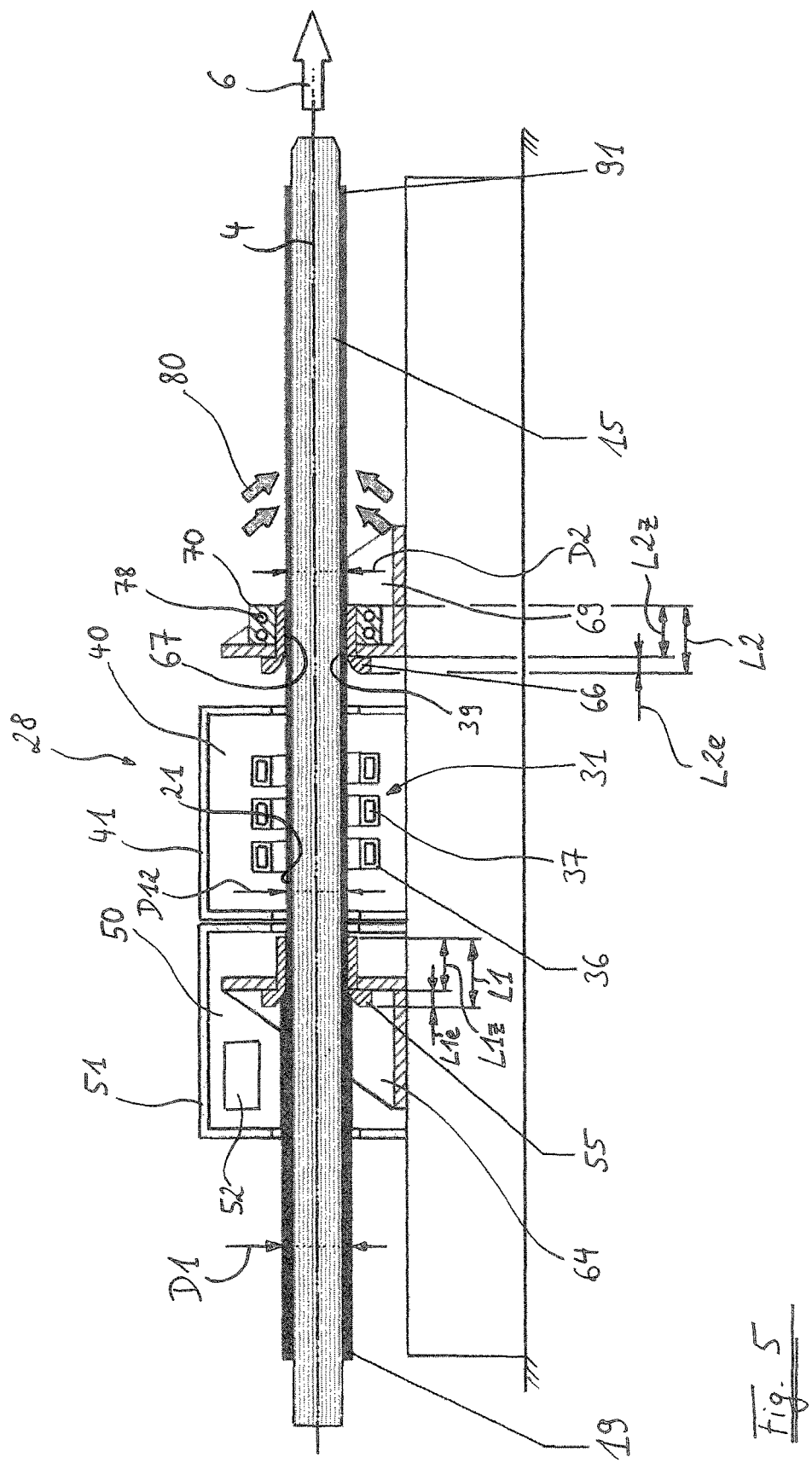
FIG. 5 displays a longitudinal sectional detail view of part of the arrangement according to the second embodiment.

The core 15 of FIG. 5 is provided with a substantially circular cross-section, and the preform 19 is embodied as a sleeve that is arranged on the core 15. After the braiding and/or winding step, an outer contour of the preform 19 is approximately circular as well and has an outer diameter D1.

Moving in the downstream direction 6 along the path of pultrusion 4, the provided preform 19 moves into a pre-heating chamber 50 through an appropriately dimensioned opening in a pre-heating chamber wall 51. Inside the pre-heating chamber 50, a first die 55 is arranged and supported by a support 64. The preform 19, moving downstream, is pre-heated in the pre-heating chamber 50 and is introduced into the first die 55. By means of the first die 55, the preform 19 is pre-compacted as it passes therethrough. In this pre-compacting step, the preform 19 is radially compressed so that the outer diameter of the sleeve-shaped preform 19, representing an outer dimension of the preform 19, is reduced from a value D1 to a smaller value D12. Along with the radial compression of the preform 19, some axial stretching of the preform 19 occurs.

Downstream of the first die 55, the pre-compacted and pre-heated preform 21 leaves the pre-heating chamber 50 via a suitable downstream opening in the pre-heating chamber wall 51 and enters a heating chamber 40 of the heating device through an opening in a heating chamber wall 41. The heating device 28 comprises an induction device 31 inside the heating chamber 40. By means of the induction device 31, the pre-compacted and pre-heated preform 21 is heated to a processing temperature of the thermoplastic matrix material which is suitable for subsequent consolidation of the preform. The processing temperature is preferably equal to or higher than the melting temperature of the thermoplastic matrix material. In this manner, the induction device 31 of the arrangement 1' acts as a main heating device for bringing thermoplastic matrix material into a molten state.

The induction device 31 of FIG. 5, like the induction device 31 of the first embodiment, comprises an induction coil that is formed of a coiled conductor 36. The conductor 36 comprises an internal cooling channel 37 through which a flow of water is established for actively cooling the conductor 36 and avoid overheating thereof. In order to generate a varying magnetic field, the conductor 36 is connected to an appropriate power source comprising a frequency generator (not shown) for causing an alternating current of suitable frequency to flow through the conductor 36. As may be inferred from FIG. 5, the induction coil approximately follows the outer contour of the composite product 91 to be produced, and therefore has a substantially circular shape in case of the second embodiment.

The core 15 and the pre-compacted, pre-heated preform 21 are gradually pulled through the interior of the induction coil. While the preform 21 moves through the center of the induction coil, a portion of the preform 21 onto which the varying magnetic field produced by the induction coil acts is rapidly and uniformly heated to the processing temperature of the thermoplastic matrix material. In case of the second embodiment, the power provided by the induction device 31 is chosen such that the preform reaches the desired processing temperature, taking account of the fact that the preform has already been pre-heated upstream of the induction device 31. The magnetic field can be adapted to the properties of the preform 21, e.g. the thickness thereof as well as the materials present, e.g. by varying the frequency and/or power of the alternating current in the conductor 36. In variants of the second embodiment, the induction coil may be shaped differently, or several induction coils, past which the preform moves, may be used. The coil shape and number may be selected depending on the cross-sectional shape of the product 91 that is to be manufactured.

Downstream of the induction device 31, the preform in its heated state 39 exits the heating chamber 40 through a downstream opening in the heating chamber wall 41 and is introduced into a second die 66. While the preform 39 is pulled through the second die 66, the preform 39 is consolidated by means of the second die 66, individual layers and strands of tape 10 are joined together by fusion, and the composite product 91 is formed. The inner diameter of the second die 66 is smaller than the inner diameter of the first die 55. An outer diameter of the heated preform 39, which approximately corresponds to the outer diameter D12 of the pre-compacted preform 21, is further reduced by means of the second die 66 to a diameter D2 of the product 91 to be produced.

When the pultruded product 91 exits the second die 66 at a downstream end of the second die 66, the product 91 is actively cooled by directing a cooling airflow 80 towards the surface of the product 91, as illustrated in FIG. 5. As the product 91 cools, the thermoplastic matrix material solidifies and the shape of the product 91 is frozen. Thus, a product 91 in the form of an endless fibre-reinforced composite tube with circular cross-section, in which the reinforcing carbon fibres are embedded in the thermoplastic matrix, is obtained. In case the outermost layer of several layers of the preform 19, for example the outermost layer 19*a* as sketched in FIG. 9, has been provided by means of braiding, the product 91 obtained according to the second embodiment comprises a laminate wherein within an outermost layer of the laminate, an arrangement of carbon fibres that are interwoven due to the braiding is embedded in the thermoplastic matrix.

Inside the pre-heating chamber 50 upstream of the heating device 28, the preform 19 is pre-heated to a temperature that is significantly lower than the processing temperature of the thermoplastic material. The temperature of the preform 19 reached in the pre-heating step is chosen such as to achieve, to some extent, an increase in the flexibility of the strands of tape 10 within the preform 19 comprising layers that have previously been formed by braiding and/or winding. Thereby, braided and/or wound strands of tape 10 and the layers that form the preform 19 are softened to some extent and become more flexible. This facilitates the radial compression and axial stretching of the preform 19 during pre-compaction. Pre-heating the preform 19 is achieved before the preform 19 is introduced into the first die 55. The preform 19 may also receive a limited amount of heat while it passes through the first die 55, as the first die 55 is located inside the pre-heating chamber 50.

However, in the pre-heating step, the temperature of the preform 19 remains significantly below the melting point of the thermoplastic matrix material, and melting of the thermoplastic matrix material does not occur. Therefore, the strands of tape 10 and the individual layers that form the preform 19 can move relative to each other without fusing, and can move relative to the core 15. Hence, the axial stretching of the preform can be accommodated without accumulation or jamming of the fibres upstream of the first die 55.

The pre-heating inside pre-heating chamber 50 may be carried out by radiation, in particular infrared radiation. Additionally or alternatively, the pre-heating may be carried out convectively, for example by means of a heated airflow inside chamber 50. Convective pre-heating may work well due to the arrangement of the strands of tape 10 which, prior to pre-compaction, may still be relatively loose. In a further variant, the pre-heating could be carried out inductively. Compared to the heating by means of the induction device 31, however, inductive pre-heating in accordance with such a variant is preferably carried out at reduced power in order to avoid any melting of the thermoplastic matrix material in the pre-heating step. As shown in FIG. 5, the pre-heating chamber 50 is provided with a suitable pre-heating device 52, which may be an infrared radiation source, a device for generating a hot air flow or an air inlet for guiding heated air into the pre-heating chamber 50, or, alternatively, may be a further induction device.

Although it is preferred that the heating by means of the heating device 28 be carried out inductively, in variants of the second embodiment, the heating device 28 could be adapted for heating the pre-heated and pre-compacted preform 21 by means of convection, e.g. by a hot airflow, and/or by means of radiation, e.g. by means of a source of infrared radiation.

It is noted that, in a similar way as it is done for the first embodiment, the preform of the second embodiment has been provided with three reference signs, namely 19, 21 and 39. Reference sign 19 refers to the preform before pre-compaction and pre-heating, reference sign 21 refers to the pre-compacted and pre-heated state of the preform upstream of and upon entry into the induction device 31, and reference sign 39 refers again to the heated state of the preform. From the above, it can be appreciated that the three numerals 19, 21 and 39 refer to different states of the same preform as it moves downstream along the path of pultrusion 4.

As sketched in FIG. 5, the second die 66 comprises a cooling component 70 which may, for example, be collar-shaped. The cooling component 70 contacts the second die 66 and comprises internal cooling channels 78 through which cooling water can flow. In this way, the contact surface 67 of the second die 66, that contacts the preform 39 during consolidation, can be actively cooled to a temperature below the processing temperature of the thermoplastic matrix material. Preferably, the contact surface 67 is kept at a temperature equal to or lower than the solidification temperature of the thermoplastic matrix material. In this manner, rapid solidification of the matrix material in outer layer of the hot preform 39 is achieved, and the preform 39 can slide through the die 66 substantially without leaving residues on the contact surface 67. In particular, this prevents deterioration of the surface of the pultruded composite product 91.

From the above, it can be seen that the heating of the preform to the processing temperature of the thermoplastic matrix material is carried out in the second embodiment between two separate dies 55 and 66. The heating to the processing temperature is performed without surface contact, preferably inductively, so that an outer surface of the preform is exposed as the preform 21, 39 moves between the dies 55, 66. A surface contact of the preform with an actively heated contact surface is avoided.

Even though the arrangement 1' sketched in FIG. 5 comprises a pre-heating chamber 50, pre-compacting the preform 19 by means of the first die 55 could, in a variant of the second embodiment, be carried out without pre-heating the preform 19. This may be expedient in case the preform has a small thickness.

The second embodiment of the present invention advantageously uses dies 55 and 66 that, due to their limited axial effective lengths L1, L2, make it possible to significantly reduce the frictional forces during pultrusion, in particular between the preform and the dies 55, 66. This allows to obtain a good surface quality and to avoid deformation of the fibre arrangement as well as accumulation of fibres upstream of the dies.

Each of the effective lengths L1, L2 of the first and second dies 55, 66, respectively, may advantageously be chosen to correspond to approximately 50 percent of their respective inner diameter. In the example displayed in FIG. 5, L1 has been chosen to be approximately 50 percent of D12, while L2 has been chosen to be approximately 50 percent of the final outer diameter D2 of the pultruded composite product 91. The effective lengths L1, L2 may be understood as corresponding to the length of an axial portion of the respective die 55, 66 which comprises the respective surface acting on the preform, in particular including a converging portion suitable for introducing and radially compressing the preform (FIG. 5).

The effective lengths L1, L2 of the first and second dies 55, 66, respectively, may advantageously be calculated using the relations L1=L1z+L1e=(v·T1)+L1e and L2=L2z+L2e=(v·T2)+L2e, where v is the delivery velocity of the product, e.g. given in centimeters per minute, measured along the path of pultrusion 4, T1 is the desired residence time of a section of the preform 19 inside a portion of the first die 55 having a length of L1z and encompassing a cylindrical or, in a variant, a slightly conical bore, and T2 is the desired residence time of a section of the preform 39 inside a portion of the second die 66 having a length of L2z and encompassing a cylindrical or, in the variant, slightly conical bore. T1 and T2 may be given in minutes. According to a preferred example, T1 and T2 each approximately correspond to 0.01 minutes. L1e and L2e denote lengths of the respective inlet portions of the dies 55, 66. In accordance with a further useful example, the portions of length L1z, L2z each have a substantially cylindrical bore. The obtained effective lengths L1, L2 of the dies 55, 66 of this example each correspond to approximately 50 percent of the inner diameter of the cylindrical portion thereof. Thus, L2 corresponds to approximately 50 percent of the final outer diameter D2 of the pultruded composite product 91 that is obtained, while L1 corresponds to approximately 50 percent of the outer diameter D12 of the pre-compacted preform 21. As an example only, L2z=1.2 cm might be used in the case of an inner diameter of the cylindrical bore portion of the die 66 of 3.0 cm, in combination with a length of the converging inlet portion of approximately L2e=0.4 cm. The same values may be chosen for the first die 55, i.e. in this example L1z=L2z, L1e=L2e. However, in other examples, the dimensions of the first die 55 may be different from those of the second die 66.

Figure 6:
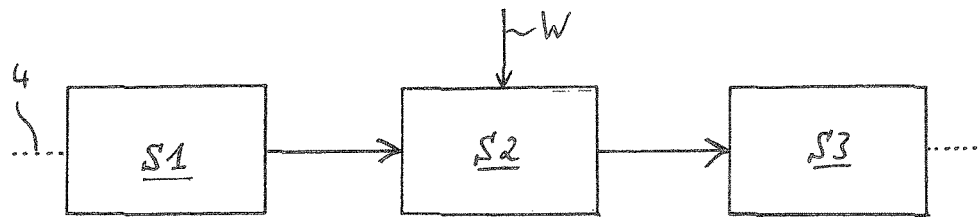
FIG. 6 illustrates a process which can be performed by means of the arrangement according to the first embodiment.

FIG. 6 schematically illustrates steps of a pultrusion method in accordance with the first embodiment. Along the path of pultrusion 4, the steps S1, S2, S3 are performed. In step S1, the preform 19 is provided. Further downstream along the path of pultrusion 4, in step S2, the preform 19 is inductively heated to a processing temperature of the thermoplastic matrix material, wherein the processing temperature is suitable for enabling subsequent consolidation of the preform. In particular, the processing temperature may be chosen to be equal to or, preferably, higher than the melting temperature of the thermoplastic matrix material. The addition of energy in order to heat the preform 19 is schematically indicated by the arrow W in FIG. 6. Further downstream along the path of pultrusion 4, in step S3, the preform—denoted by reference sign 39 in its heated state—is introduced into the die 45 and is consolidated by means of the die 45, while the preform 39 passes through the die 45. After final cooling, the pultruded fibre-reinforced composite product 91 is obtained.

Figure 7:
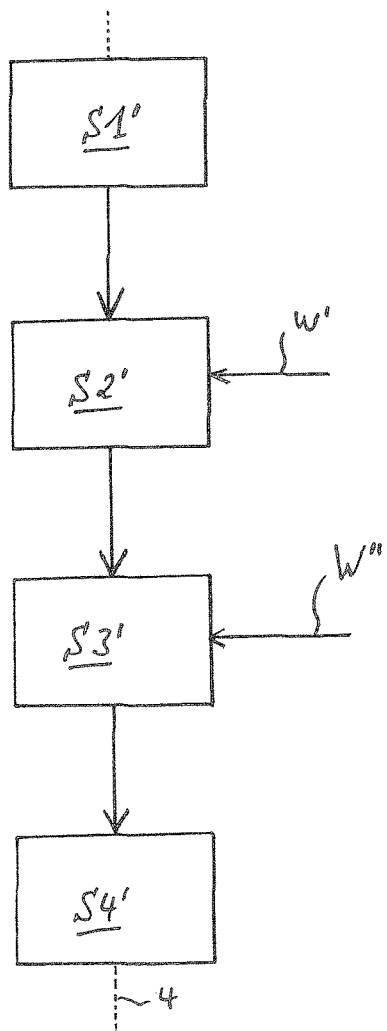
FIG. 7 illustrates a process which can be performed by means of the arrangement according to the second embodiment.

FIG. 7 schematically illustrates steps of a pultrusion method in accordance with the second embodiment of the invention. Along the path of pultrusion 4, the steps S1', S2', S3', S4' are performed. In step S1', a preform 19 is provided. Further downstream along the path 4, the preform 19 is introduced into the first die 55 in step S2'. During step S2', the preform 19 is pre-heated. The energy addition corresponding to the pre-heating is indicated by arrow W'. Further, during step S2', the preform 19 is pre-compacted by means of the first die 55 while the preform 19 passes through the first die 55. Further downstream along path 4, the pre-compacted preform 21 is heated in step S3' to a processing temperature of the thermoplastic matrix material, the processing temperature being suitable for subsequent consolidation of the heated preform 39. Preferably, the processing temperature is equal to or above the melting point of the thermoplastic matrix material. The addition of energy in order to heat the preform 21 to the processing temperature is schematically indicated by the arrow W''' in FIG. 7. Further downstream along the path 4, in step S4', the preform 39 is introduced into the second die 66 and the preform 39 is consolidated by means of the second die 66 while passing through the second die 66. After final cooling, for example by a cooling airflow directed onto the pultruded fibre-reinforced composite product 91 in order to achieve solidification of the matrix material, the product 91 to be manufactured is obtained.

With regard to the first and second embodiment, the induction device 31 induces an electric current in the electrically conductive carbon fibres. According to Joule's law, resistive heating of the carbon fibres in the tape 10 occurs. Moreover, capacitive losses due to fibres crossing each other without touching each other, and transfer losses in places where crossing fibres are in connection with each other over a small area, can contribute to the inductive heating. Thus, the heat required to raise the temperature of the preform to the desired processing temperature is generated inside the preform 19, 21. The heat can spread from the inductively heated carbon fibres by heat conduction over relatively short distances through the preform. Thereby, the preform is uniformly and rapidly heated. Larger temperature gradients inside the preform, which might arise due to hollow spaces or voids in the preform 19, 21 that may impede heat conduction from a heated surface towards the interior of the preform if the surface alone is heated, can be avoided.

The structure of a braid, with carbon fibres repeatedly crossing each other, creates loops of electrically conductive paths inside the preform, along which the induced current can flow. In combination with a suitable angular orientation of the reinforcing fibres with respect to the varying magnetic field, and thus with respect to the induction coil, a very efficient heating of the preform can be achieved. In variants of the embodiments described above, such loops might also be created by suitable laying and local interweaving of the strands of tape 10 to form a fabric. Unidirectional axial reinforcing fibres may be integrated into the preform, e.g. by combining them with braided and/or wound layers and/or with layers of fabric, and may be integrated into the conductive loops or may receive heat by heat conduction over a short distance from the inductively heated braided or woven fibres. As an example, triaxial braided layers could be provided in the preform 19.

In each of the first and second embodiments, the thermoplastic matrix material may, as an example, be a polyether ether ketone (PEEK), in which case the processing temperature may be chosen in the range from 380 degrees Celsius to 400 degrees Celsius. In variants of these embodiments, the thermoplastic matrix material might be a polyphenylene sulfide (PPS) or a polyamide (PA). The temperature range for the processing temperature may then be chosen differently according to the thermoplastic matrix material used.

The product 91 manufactured according to each of the first and second embodiments may be particularly useful as an endless fibre-reinforced composite tube that, after pultruding, can be cut to the desired length and can be subjected to a further forming operation at a later time.

In each of the first and second embodiments, the core 15 and the preform 19 may be pulled along the path of pultrusion 4 through the die 45 or the first and second dies 55, 66 in a continuous or in a discontinuous manner.

Figure 8:
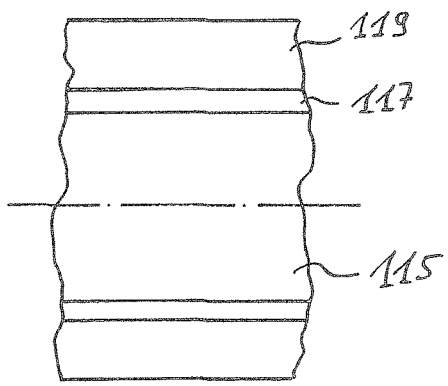
FIG. 8 illustrates a preform braided and/or wound onto a liner arranged on a core, as it may be used in further embodiments of the invention.

In each of the first and second embodiments, the core 15 may be made of an electrically conductive material that can be heated while passing through the center of the coil of the induction device 31. However, it may be preferable to provide a core 15 that is not electrically conductive and is not inductively heatable, for example made of a glass-fibre reinforced synthetic material or of a ceramic material. Such a core 15, which may be inductively heatable or may be not inductively heatable, could be actively cooled, in particular for controlling the temperature profile within the preform, especially while the preform 19, 21 is inductively heated and passes through the die 45 or the second die 66. This may be useful, for example, for producing a fibre-reinforced composite tube having an inner thermoplastic liner. A preform 119 of previously consolidated carbon-fibre thermoplastic tape 10 that has been arranged, e.g. by braiding or winding or both, on an actively cooled, not inductively heatable core 115 with the interposition of a liner 117 is schematically shown in FIG. 8 in an exemplary manner. The liner 117 may be formed as a tube of thermoplastic synthetic material, arranged on the core 115, and the strands of tape 10 can be braided and/or wound onto the liner 117 in order to form the preform 119. Actively cooling the core 115 may be used advantageously for achieving a temperature profile that allows to reliably join the thermoplastic matrix material of the preform 119 with the thermoplastic material of the liner 117, while avoiding melting of the entire liner 117. A liner 117, as schematically shown in FIG. 8, may be used to manufacture a product 91 as described above with reference to FIGS. 1 to 7.

It is noted that for manufacturing a single thick-walled fibre-reinforced composite product, the processes and arrangements as illustrated in FIGS. 3 and 5, respectively, may be performed several times in a row. A corresponding variant of the second embodiment will be briefly explained in the following.

In order to manufacture a product having a greater wall thickness, a further preform 19 in the form of a further layer, or comprising several further layers, of braided and/or wound tape 10 can be provided on an outer surface of the product 91 which exits from the second die 66 in FIG. 5. Thus, in this variant, the product 91 of FIG. 5 may be considered an intermediate product. The additional preformed layer is then, in this variant, pre-heated and pre-compacted in the same manner as set forth above, by means of a further first die 55, arranged inside a further pre-heating chamber 50 downstream of the second die 66 of FIG. 5. Downstream of the further pre-heating chamber 50, in this variant, a further heating device 28, and downstream of the further heating device 28, a further second die 66 would then be provided for heating and consolidating the additional preformed layer(s). It may be envisaged to repeat this succession of steps several times, until a product of the desired wall thickness has been obtained.

Moreover, the method and arrangement according to the second embodiment illustrated in FIG. 5 may alternatively be varied by providing several first dies 55, each arranged inside an associated pre-heating chamber 50, along the path of pultrusion 4. Upstream of the first one of the first dies 55, a layer or layers of a preform 19 can be braided and/or wound onto the core 15. Between the pre-heating chambers 50 which each contain one of the first dies 55, further layers of braided and/or wound tape 10 can be arranged on top of the previously provided and pre-compacted layers of the preform. The completed preform is, according to this variant, heated to the processing temperature downstream of the last one of the first dies 55 and pre-heating chambers 50 by means of a heating device 28 and is consolidated downstream of the heating device 28 by means of a second die 66, in the manner already described above. As an example, three layers could be braided and/or wound onto the core 15 and could be pre-compacted by means of a first die 55 inside a first preheating chamber 50, then three additional layers could be braided and/or wound onto the already pre-compacted initial three layers and could be pre-compacted by a further first die 55 inside a further pre-heating chamber 50, and downstream thereof, heating to the processing temperature and consolidation by means of the second die 66 could take place. An exemplary, suitable arrangement in this case comprises three braiding or winding devices 3 followed by a first die 55, followed by again three braiding or winding devices 3 and another first die 55, downstream of which a heating device 28 and further downstream a second die 66 would be arranged. However, the number of provided preform layers in relation to the number of first dies 55 may be further varied. In another example, six preform layers could be provided, wherein each step of providing a further layer is followed by a first die 55, in which case six first dies 55 having increasing inner bore diameters would preferably be provided for such an arrangement.

Although the invention has been completely described above with reference to preferred embodiments, the invention is not limited to these embodiments but may be modified in many ways.

For example, in the thermoplastic matrix material, electrically conductive particles may be provided, in particular if reinforcing fibres that are substantially electrically non-conductive are used to reinforce the composite product, in order to enable inductive heating of the preform.

Although the invention may be particularly useful for manufacturing hollow composite profiles, in particular of tube-like shape, the invention may nevertheless also be applied to the production of profiles having a full (i.e. not hollow) cross-section of any desired shape.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pultrusion method for manufacturing a fibre-reinforced composite product comprising reinforcing fibres embedded in a thermoplastic matrix material, wherein along a path of pultrusion, the method comprising:
providing a preform by forming the preform from strands of a semi-finished product, wherein the semi-finished product is a fully consolidated tape comprising the thermoplastic matrix material and the reinforcing fibres which are embedded in the thermoplastic matrix material;
further downstream, inductively heating the preform to a processing temperature of the thermoplastic matrix material, the processing temperature being suitable for enabling subsequent consolidation of the preform, wherein the heat for heating the preform up to the processing temperature is introduced in a non-contact manner; and
further downstream, introducing the preform into a die and consolidating the preform by the die while the preform passes through the die, in order to form the composite product, wherein the die is not actively heated or is actively cooled.

2. The pultrusion method according to claim 1, wherein at least in the region of a contact surface of the die which contacts the preform passing through the die, the die is actively cooled to a temperature equal to or lower than the solidification temperature of the thermoplastic matrix material.

3. The pultrusion method according to claim 1, wherein the processing temperature is equal to or higher than the melting temperature of the thermoplastic matrix material.

4. The method according to claim 1, wherein the composite product comprises a laminate, and
wherein an outermost layer of the laminate comprises an arrangement of interwoven reinforcing fibres provided by a braiding process.

5. The pultrusion method according to claim 1, wherein the preform is provided by forming the preform from the semi-finished product by braiding and/or winding.

6. The pultrusion method according to claim 1, wherein the preform is suitably shaped for manufacturing a hollow composite product from the preform.

7. The pultrusion method according to claim 1, wherein the preform is provided on a core which is moved downstream along the path of pultrusion together with the preform.

8. The pultrusion method according to claim 1, wherein the preform is provided directly on a core which is moved downstream along the path of pultrusion together with the preform, or
wherein the preform is provided on a liner arranged on a core which is moved downstream along the path of pultrusion together with the preform, the liner being arranged between the core and the preform.

9. A pultrusion method for manufacturing a fibre-reinforced composite product comprising reinforcing fibres embedded in a thermoplastic matrix material, wherein along a path of pultrusion, the method comprising:
providing a preform by forming the preform from strands of a semi-finished product, wherein the semi-finished product is a fully consolidated tape comprising the thermoplastic matrix material and the reinforcing fibres which are embedded in the thermoplastic matrix material;
further downstream, introducing the preform into a first die and pre-compacting the preform by the first die while the preform passes through the first die;
further downstream, heating the pre-compacted preform to a processing temperature of the thermoplastic matrix material, the processing temperature being suitable for subsequent consolidation of the preform, wherein the heating of the preform to the processing temperature is performed without surface contact; and
further downstream, introducing the preform into a second die and consolidating the preform by the second die while the preform passes through the second die, in order to form the composite product, wherein the second die is not actively heated or is actively cooled.

10. The pultrusion method according to claim 9, wherein the heating of the preform to the processing temperature of the thermoplastic matrix material is performed by induction.

11. The pultrusion method according to claim 9, wherein before and/or while passing through the first die, the preform is pre-heated to a temperature below the processing temperature of the thermoplastic matrix material.

12. The pultrusion method according to claim 9, wherein at least in the region of a contact surface of the second die, which contacts the preform passing through the second die, the second die is actively cooled to a temperature equal to or lower than the solidification temperature of the thermoplastic matrix material.

13. The pultrusion method according to claim 9, wherein the preform is provided by forming the preform from the semi-finished product by braiding and/or winding.

14. The pultrusion method according to claim 9, wherein the preform is suitably shaped for manufacturing a hollow composite product from the preform.

15. The pultrusion method according to claim 9, wherein the preform is provided on a core which is moved downstream along the path of pultrusion together with the preform.

16. The pultrusion method according to claim 9, wherein the preform is provided directly on a core which is moved downstream along the path of pultrusion together with the preform, or
wherein the preform is provided on a liner arranged on a core which is moved downstream along the path of pultrusion together with the preform, the liner being arranged between the core and the preform.

* * * * *